June 12, 1956 — R. P. HAVILAND — 2,749,705
FUSIBLE LINK JET MOTOR CONTROL
Filed Jan. 3, 1951
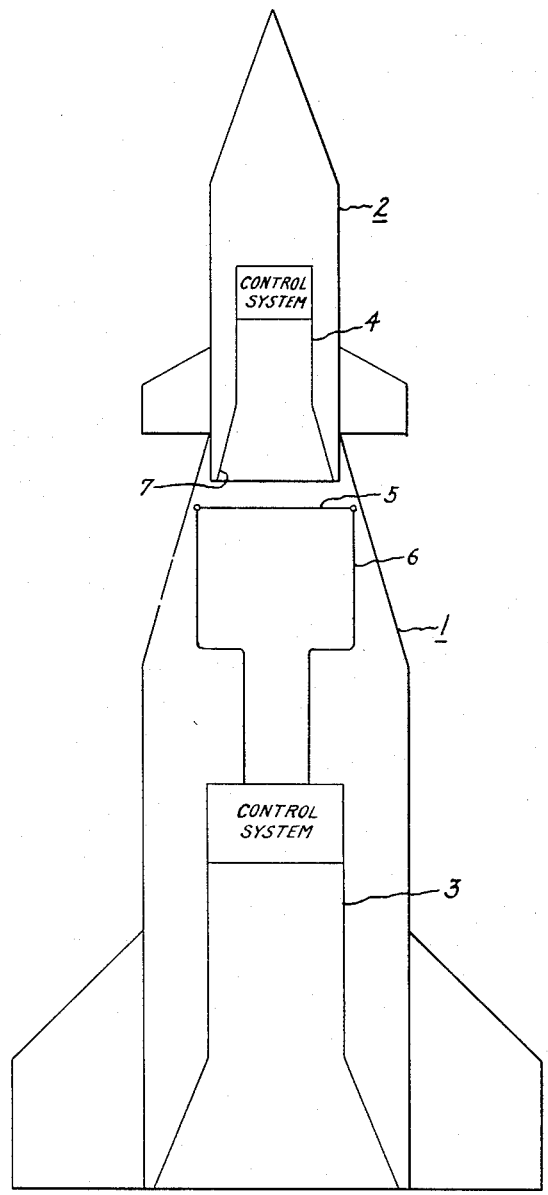
Inventor:
Robert P. Haviland,
by *Clarke N. Mott*
His Attorney.

United States Patent Office 2,749,705
Patented June 12, 1956

2,749,705

FUSIBLE LINK JET MOTOR CONTROL

Robert P. Haviland, Scotia, N. Y., assignor to General Electric Company, a corporation of New York Application January 3, 1951, Serial No. 204,101

4 Claims. (Cl. 60—35.6)

This invention relates to jet propulsion systems. More particularly, it relates to multi-stage or step, jet-propelled vehicles wherein means is provided for accurately adjusting the time of separation of the booster and succeeding stages with respect to the operation of their motors.

While the present invention is described with particular reference to systems wherein the succeeding stage as well as the booster stage vehicle is a rocket, it is to be understood that either stage may be any of other types of jet-propelled vehicles, e. g. a ram jet.

In order to attain greater altitudes, velocity, and range from jet-propelled vehicles, it is often desirable to utilize the step principle wherein a usually smaller second stage vehicle is carried as a payload by a first stage or booster vehicle, the succeeding stage vehicle being launched from the booster vehicle when the fuel supply of the latter is almost exhausted.

It is well known that, for maximum performance and control over the multi-stage, jet-propelled system, the booster stage motor must be shutoff as soon as possible after the succeeding stage motor has been started. If the succeeding stage motor is started too early, full utilization of the fuel of the booster stage is not obtained. Further, with such early starting, the hot exit gases of the succeeding stage exit within the booster stage and may damage the latter to such an extend that separation becomes very difficult, if not impossible. On the other hand, if the motor of the succeeding stage is started after the booster motor has ceased operation, the drag and negative acceleration on the composite vehicle may cause the fuel and oxidizer in the succeeding stage vehicle tanks to move forward away from the reactant outlets and cause a misfire.

It has been customary heretofore to control the starting of the succeeding stage thrust by time sequence means. According to this method ground tests are made of the booster system to determine its length of operation and time operated means then employed to start the succeeding stage just before the time when the booster is supposed to cease operation. This method has not proved successful in actual practice because of differences in the behavior of various vehicles as well as differing atmospheric conditions encountered in actual flight which, using this method of operation, may cause loss of control of the systems or serious deviations from the prescribed course.

It is the object of this invention to provide means for terminating the operation of the booster stage of a multi-stage, jet-propelled system immediately upon the starting of the succeeding stage motor.

Other objects will become apparent from a consideration of the following description and the drawing in which the single figure shows a multi-stage, jet propulsion system embodying this invention.

It has been found that very simple means may be provided for accurately timing the relative operation of the booster and succeeding stage of a multi-stage, jet-propelled system.

Specifically, it has been found that such accurately timed operational sequence may be attained by mounting in the path of the hot exit gases of the succeeding stage, or just downstream of its nozzle, a wire, link, or element which is almost instantaneously fusible under the heat of the gases to interrupt the control circuit of the booster stage and shut off the thrust of the latter.

While the following description relates primarily to two stage or step, jet propulsion systems, the means set forth therein can be readily applied to such a system having any number of successively operated stages.

Referring to the drawing, the first stage or booster vehicle 1 carries the separable succeeding stage vehicle 2 in its nose by means of suitable structural supports which are not shown. Each stage contains a control system represented conventionally and motors 3 and 4 respectively. Such control systems are shown conventionally since they are well-known to those skilled in the art. Patent 2,398,201 to Young et al. illustrates a typical rocket control. It will be obvious to those skilled in the art that fusible link 5 of the present invention may simply replace a part of one of the electrical conductors 47 in series with switch 45 to accomplish the present purpose. Downstream of the succeeding stage motor nozzle is mounted fusible wire, link, or element 5 connected in circuit with the control system of the booster stage. While element 5 is preferably mounted downstream of the second stage nozzle 7, it may also be placed within the nozzle or at any other location so long as it is quickly fused or melted by the hot gases exiting from nozzle 7.

Fusible link 5 may be of any suitable conducting material such as copper, nickel, steel and the like, and is preferably of such size that the hot gas blast from the succeeding stage, having a temperature of the order of 3000° C., will melt it almost instantaneously. As an example of the operation of the invention, a No. 11 copper wire in actual use fused in about twenty milliseconds.

The operation of the illustrated device comes into play only when combustion is initiated in the second stage by means which are well-known in the art. The second stage may typically be started by radio signal using conventional means of which the radio controlled means described in Patent 2,413,621 to Hammond is exemplary. A timing device may also be used to initiate the second stage. The continued operation of the first stage requires that circuit 6 be completed through fusible link 5. As soon as combustion is started in the second stage the hot combustion gases emitted by the second stage quickly fuse the link 5, thereby interrupting the operating circuit of the first stage and enabling the second stage to pull cleanly away.

By varying the material or size of element 5, or other electrical elements, the time delay between the starting of the succeeding stage motor and the shutting off of the booster stage motor may be controlled within any desired time period to provide for variations in design and size of the vehicles.

There is provided by this invention means for positively and accurately terminating the operation of a booster jet-propelled vehicle upon the starting of the motor of the succeeding stage.

While only one embodiment of the invention has been shown and described, it will be understood that various modifications may be made therein without departing from the scope of the present disclosure with its fusible element principle of operation.

What I claim as new and desire to secure by Letters Patent of the United States is:

1. In a multi-stage, jet-propelled system having at least a first and second stage, an electrical control system for said first stage, said electrical control system having a circuit which must be closed in order for said first stage to operate, and means for stopping the operation of the first stage immediately upon the initiation of the second stage operation comprising heat-fusible element means disposed downstream from the second stage motor for interrupting the electrical circuit of the first control system.

2. In a multi-stage, jet-propelled system having at least a first and second stage, an electrical control system for said first stage, said electrical control system having a circuit which must be closed in order for said first stage to operate, and means for stopping the operation of the first stage motor upon the initiation of the second stage motor, said means comprising a heat-fusible element so disposed with relation to the second stage motor as to be substantially immediately melted by the hot exit gases issuing therefrom, said fusible element being in circuit with the control system of the first stage motor.

3. In a multi-stage, jet-propelled system having at least a first and second stage, an electrical control system for said first stage, said electrical control system having a circuit which must be closed in order for said first stage to operate, and means for stopping the operation of the first stage motor immediately after starting of the second stage motor, said means comprising a heat-fusible element disposed in the path of the hot gases from the second stage motor, said element being in circuit with the control system of the first stage motor, whereby, when said heat-fusible element is melted, said first motor system is interrupted.

4. In a multistage, jet-propelled system having at least a first and second stage, a control system in said first stage having an electric circuit which must be closed in order for driving fluid combustion to take place in said first stage, and a fusible link in said circuit positioned in the path of hot gases emitted by said second stage on the initiation of combustion therein.

References Cited in the file of this patent

UNITED STATES PATENTS

| | | |
|---|---|---|
| 1,901,852 | Stolfa et al. | Mar. 14, 1933 |
| 2,114,214 | Damblanc | Apr. 12, 1938 |
| 2,398,201 | Young et al. | Apr. 9, 1946 |
| 2,413,621 | Hammond | Dec. 31, 1946 |
| 2,465,926 | Queen et al. | Mar. 29, 1949 |
| 2,476,218 | Prime et al. | July 12, 1949 |
| 2,574,495 | Parker | Nov. 13, 1951 |
| 2,560,445 | Jackson | July 10, 1951 |

FOREIGN PATENTS

| | | |
|---|---|---|
| 621,407 | Great Britain | Apr. 8, 1949 |